United States Patent [19]

Vrielink

[11] 4,418,386
[45] Nov. 29, 1983

[54] COMMUNICATION BUS FOR A MULTI-SOURCE/RECEIVER DATA PROCESSING SYSTEM

[75] Inventor: Hendrik Vrielink, Eindhoven, Netherlands

[73] Assignee: U.S. Philips Corporation, New York, N.Y.

[21] Appl. No.: 255,916

[22] Filed: Apr. 20, 1981

[30] Foreign Application Priority Data

Apr. 23, 1980 [NL] Netherlands .................. 8002346

[51] Int. Cl.³ .............................................. G06F 3/00
[52] U.S. Cl. .................................................. 364/200
[58] Field of Search ..................... 364/200 MS File

[56] References Cited

U.S. PATENT DOCUMENTS

| | | | |
|---|---|---|---|
| 3,593,300 | 7/1971 | Driscoll, Jr. et al. | 364/200 |
| 4,110,823 | 8/1978 | Cronshaw et al. | 364/200 |
| 4,151,592 | 4/1979 | Suzuki et al. | 364/200 |
| 4,153,934 | 5/1979 | Sato | 364/200 |

OTHER PUBLICATIONS

Gasaglia, G. F., Distributed Computing System: A Biased Review Euromicro, Oct. 1976, vol. 2, No. 4.
A Systematic Approach to the Design of Digital Bussing Structures Thurber et al., Fall Joint Computer Conference 1972.
Cobus, A Firmware Controlled Data Transmission System Sommer, Euromicro, 1976.
Expandable Microprocessor Bus For Distributed Processing Kaplinski, Electronic Components and Applications, vol. 4, No. 4, 8/1982.
News Report on D²B and I²C Buses, Elcoma Marketing Communications Group Sep. 1981.

*Primary Examiner*—Harvey E. Springborn
*Attorney, Agent, or Firm*—James J. Cannon, Jr.

[57] ABSTRACT

A multi-source/receiver data processing system has a communication bus of at least one transfer medium. Clock signal generators have different clock frequencies with respect to each other. To prevent sources and/or receivers having a slow clock signal generator from being excluded as rightful participants from an action concerning a communication, the system determines whether said bus is "ready" for executing an action using first and second detecting means whereby it can allocate a first and a second period of time thereto, respectively. When a source/receiver determines that this second period of time has expired, the bus is indeed ready for this source/receiver and all further source/receivers which have meanwhile determined during their first period of time that the bus in ready, so the bus can be occupied by this action.

18 Claims, 18 Drawing Figures

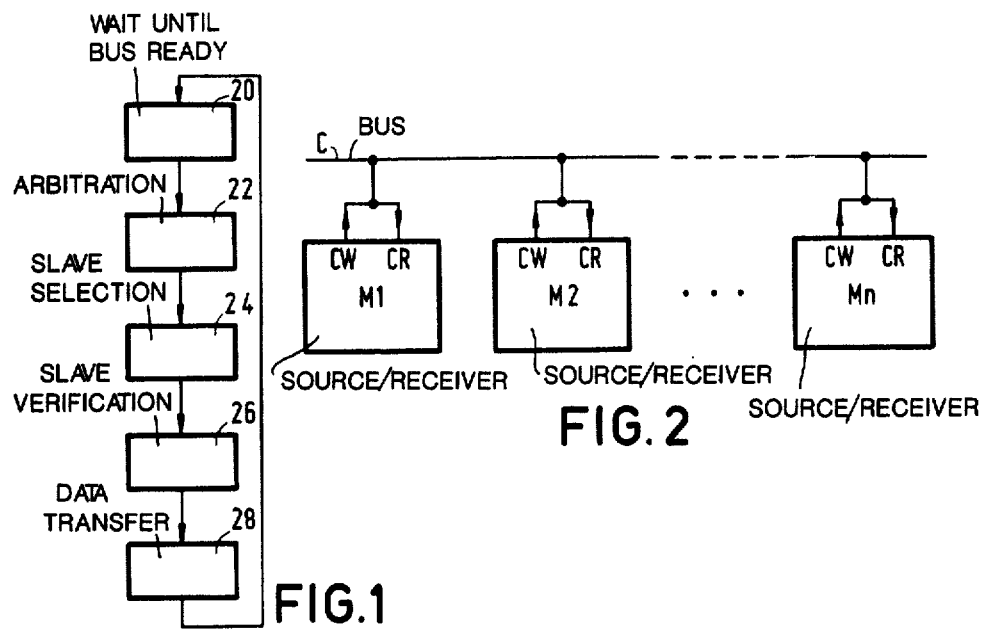

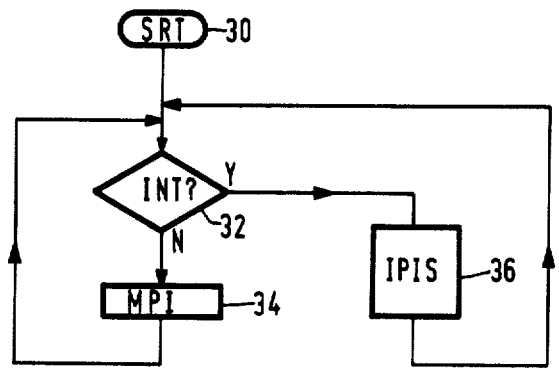
FIG.9
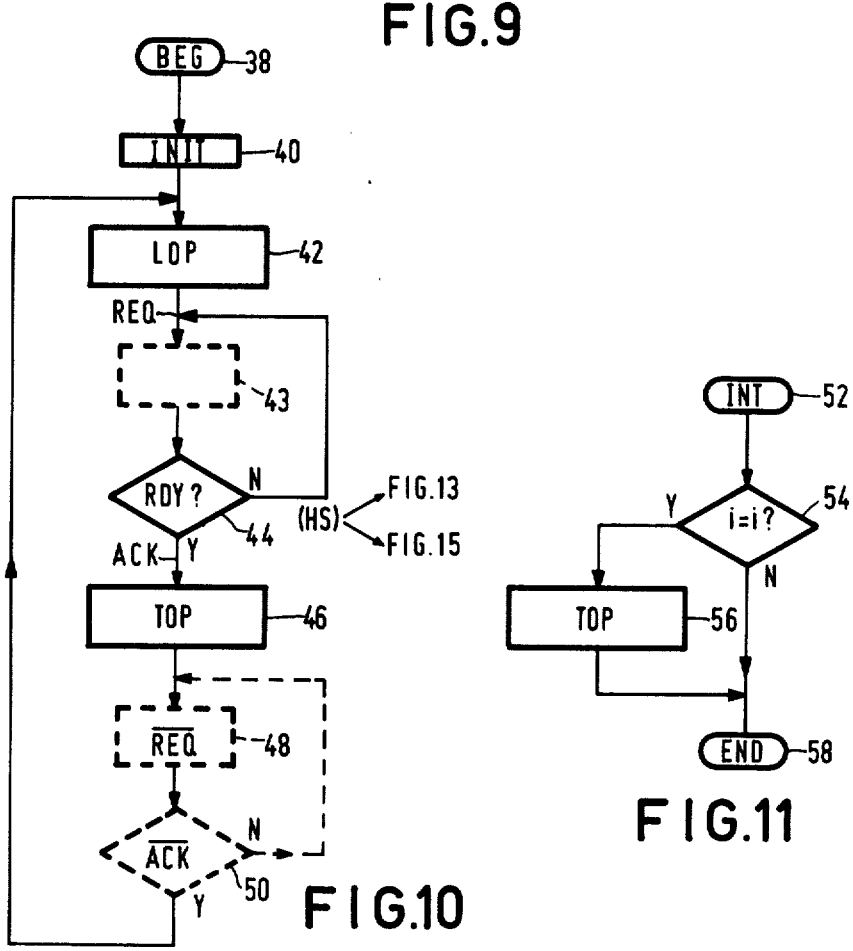
FIG.10
FIG.11

| | A(0---n, | n+1, | n+2, | n+3) | 0 0 1 2 3 4 5 6 |
|---|---|---|---|---|---|
| REQ=0 | 0 | 0 | 0 | 0 | 0 0 0 0 0 0 0 |
| | | 0 | 1 | 0 | |
| | | 1 | 0 | 1 | |
| REQ=1, CLR | | 1 | 1 | | |
| Tt=$T_{Ai}$ | $a_{Ai}$ | 0 | 0 | 0 | 0 0 0 0 1 0 0 |
| $T_{Bi}$ | $a_B$ | 0 | 0 | 0 | 0 1 0 0 0 0 0 |
| $T_{Bi}+T1i$ | $a_B+a1i$ | 0 | 0 | 0 | 0 0 1 0 0 0 0 |
| +T2i | +a2i | 0 | 0 | 0/1 | 1 0 1 0 0 0 0 |
| +T3i | +a3i | 0 | 0 | 0/1 | 0 0 0 0 0 0 0 |
| +$T_{Ei}$ | +$a_{Ei}$ | 0 | 0 | 0/1 | 0 0 0 0 1 0 1 |
| +$T_{Fi}$ | +$a_F$ | 0 | 1 | 0/1 | 0 1 0 0 0 0 1 |
| $T_{Bi}$ | $a_B$ | 0 | 1 | | - - - - - - - |

COMMUNICATION BUS FOR A MULTI-SOURCE/RECEIVER DATA PROCESSING SYSTEM

BACKGROUND OF THE INVENTION

1. Field of the Invention

The invention relates to a multi-source/receiver system in which the data source (sources) and data receiver (receivers) are connected to a communication bus which consists of at least one transfer medium which is suitable for the transport of at least one logic level (0 or 1).

2. Description of the Prior Art

Systems of this kind are known, notably systems in which the data sources and receivers consist at least partly of signal processor units such as microprocessors etc. Due to the increasing availability of micro-electronics in the form of increasingly further integrated electronic functions on so-called chips, the time has come for the application of micro-electronics in fields where costs have to be minimized; for example, in consumer products such as video equipment, audio equipment, etc. When co-operation between different apparatus in a network (for example, video or audio network of equipment) is desirable or required, communication between the various parts will be necessary. Given apparatus or parts thereof will then act as a data source or a data receiver or may even combine both functions. In a system comprising a number of data sources and receivers it is known to use a so-called communication bus for mutual communication; for example, see the article by Casaglia in Euromicro Newsletter, October 1976, Volume 2, No. 4, page 5 and further. Thus far, these communication buses had ample capacity, which means that they included a number of lines which provide smooth execution of the communication. Systems comprising 4-line and 8-line buses etc. are universally known. The most direct approach to the problem of an asynchronous communication between sources and receivers requires four lines: at least one data line and three handshake lines. According to this solution (for example, see Fall Joint Comp. Conf. 1972, pages 719–740) communication is possible between the modules without it being necessary for the modules to know each other's processing speed. However, a communication bus of this kind is too complex and often too expensive for use as a bus in fields where the costs have to be minimized.

Solutions have been pursued where the communication bus and hence the communication to be executed thereby is as simple and inexpensive as possible. Notably a bus comprising a minimum number of transfer lines would qualify in this respect. Minimum means at least one transfer medium which is suitable for the trasport of at least one logic level (0 or 1). In practice this may be a coaxial cable, a twisted core pair or also a wireless connection, or an optical fiber connection. In the latter examples, for example, there may be a connection by way of a carrier wave modulated with at least the logic level 0 or 1, or an infrared beam or light beam. A known example of a multi-source/receiver data processing system of the described kind is published in the conference papers known as EUROMICRO 1976: R. Sommer, "Cobus, a firmware controlled data transmission system", pages 299–303. "Cobus" stands for coaxial bus. Communication is realized thereby between a number of stations comprising microprocessors. However, this system does not satisfy the requirements as regards low cost. Also, the requirements as regards timing in the various processors are rather severe. For smooth execution of communication, the participating processors must know the bit periods of the other processors. This means that each processor must include an expensive crystal oscillator, or that the system must include a central clock, or that a timing network has to be trimmed after assembly, which is also expensive and notably unreliable.

Such an inexpensive and reliable solution also implies a simple solution, because once a system of this kind is in operation (for example, in a consumer home), special trimming and other adaptation steps may no longer be necessary. This is even more applicable when the addition of new data sources and/or data receivers at a later stage is a feature of the system.

SUMMARY OF THE INVENTION

The invention has for its object to provide a solution which satisfies the described requirements as regards low cost, reliability, simplicity and possibility of future extension. To this end, the multi-source/receiver data processing system of the described type has several features.

the system includes a plurality of clock signal generators having different frequencies and degrees of accuracy (hereinafter referred to as tolerances). The system provides, in the source (sources) and/or the receiver (receivers) circuits whereby it can be determined for all sources and/or receivers which actively participate in an action concerning a communication (active participants) whether said bus is ready for executing said action. These circuits include first and second detecting circuits whereby it can be determined that during a first and a second period of time, respectively, (for example, $T_A$ and $T_B$), the communication bus is ready for the relevant action, the first period of time being smaller than the second period of time (for example, $T_A < T_B$), the first period of time being determined by a preparation time factor (for example, $a_A$) of the relevant active participant, the second period of time being related to the largest product ($R \cdot V$) of the set of products ($Ri \cdot Vi$) of all potential active participants, the products ($Ri \cdot Vi$) being formed per active participant by a tolerance factor (Ri) of the clock signal generator for the active participant and a response time factor (Vi) of this active participant. When an active participant detects that the second period of time ($T_B$) as expired, the bus is (indeed) ready for executing the relevant action and can thus be occupied by this action for this active participant and all further active participants which have meanwhile detected, at least during their relevant first period of time, that the bus is ready.

The invention allows ample tolerance differences of the clock signal generators present in the system. These tolerances are taken into account: as the tolerances are larger, the second period of time will be longer due to the dependency of the tolerance factor (R). This means a reduced communication speed, but it does not affect the requirements imposed. It is to be noted that in these systems, such as notably a consumer system, the fac of speed is not so important as in more professional systems in which the use of communication buses comprising a number of lines (for example, 4 or 8, etc.) is not prohibitive per definition.

In a multi-source/receiver data processing system two kinds of sources and/or receivers may in principle be included: active and passive units.

Active units are those which can independently participate actively in an action concerning a communication. Hereinafter, units of this category are also referred to as "modules". A source or receiver can thus become the master of the system. In addition, these active sources and or receivers may remain passive by choice or may have to remain passive due to a higher priority of another active source or receiver. In the latter cases these sources and/or receivers may act as slaves in the system.

Passive units are those which cannot independently take an initiative in order to obtain a communication connection. A source and/or receiver of this kind, therefore, can only act as a slave in the system.

When reference is made to "active participants", the active data source (sources) and/or receiver (receivers) are meant which indeed participate in an action concerning a communication at a given instant. This need not be the total number of active data sources and receivers present, because there is not always a situation where the total number wishes to participate. It is to be noted again that, obviously, a data source may also be a data receiver and vice versa.

The invention is based on the recognition of the fact that all active participants must have the opportunity of actually participating in an action concerning a communication. The different clock tolerances may not be the cause that active participants having a clock which is too slow cannot participate (because they do not react quickly enough to participate in such an action). In order to achieve this object, a so-called "induction mechanism" is introduced by the introduction of said first and second period of time (for example, $T_A$ and $T_B$) which ensures that all active participants can indeed participate. This can be illustrated as follows: assume that several modules wish to use the bus. To this end, they must wait until the bus has been "ready" for a sufficiently long period of time. Also assume that the local clock signal generator of a first module is faster than that of a second module. The first module can thus know that the bus is free, which means ready for use, sooner (after $T_B$) than the second module. The first module then starts using the bus ("occupies" the bus). The induction mechanism ensures that the second module (which has meanwhile detected the instant $T_A$), after having detected that another module (the first module) has started using the bus, also starts to use the bus in reaction thereto.

The term "response time" of a data source and data receiver relates to the time required by such a module in order to react to a data bit. Normally speaking, the response time is a product of a factor $V_i > 1$ and the clock signal period duration for such a module ($M_i$).

The term "action concerning a communication" has already been used several times in the foregoing. A communication consists of a number of actions to be executed:

the issuing of requests ("start") by several active participants for establishing a communication connection;

the execution of a selection procedure from several active participants requesting a communication connection (master selection) on the basis of priority and/or address data;

establishment by the master of the connection with the source or receiver which serves as a slave in this communication (so-called "open-slave" phase);

the data transfer itself.

The described induction mechanism in accordance with the invention is important for the first two actions. It should be possible for more than one active participant to participate in spite of different clock tolerances. For the last two actions, this is no longer urgent, because the direct connection is concerned between a master and a slave which is addressed and which enters into a data transfer with the master. Because the master knows which unit is the slave, it is feasible that the master also knows the response time of the slave and takes into account this time for the data transfer. In practice it will be possible to adapt the data transfer speed to the relevant situation between master and slave: higher speeds can then be realized. It is not necessary to take into account data sources and or receivers which react more slowly.

To enable the "induction" for the first action, the multi-source/receiver data procesing system in accordance with the invention includes circuits which determine that the communication bus is ready for executing an action concerning the issuing of requests (start) by several active participants for realizing a communication connection. In order to enable the induction notably for said second action, the multi-source/receiver data processing system includes circuits which determine that the communication bus is "ready" for executing an action concerning the execution, on the basis of priority and/or identity data, of a selection procedure from several data sources and/or receivers (active participants) requesting a communication connection.

To obtain fast and unambiguous decisions on the communication bus when several active participants present their data to the bus, a further embodiment of the multi-source/receiver data processing system having a communication bus consisting of at least one transfer medium includes a wired logic gate function ("wired AND" or "Wired OR") per connection of an active participant.

Especially important are solutions where the communication bus consists of only one or two transfer media. For the issuing of requests (start) by several active participants, the system having only one transfer medium has a minium second period of time $T_B$ which satisfies the expression $T_B = a_B \underline{Tc} = (R^6 \cdot V) \cdot \underline{Tc}$ per active participant (M), in which Tc is the period duration of the clock signal generator for this active participant (M). Furthermore, in this case the system having two transfer media has a minimum second period of time $T_B = (R^3 \cdot V) \cdot \underline{Tc}$.

For the selection procedure, the system having a single transfer medium has a minimum second period of time $T_F = a_F Tc = (R^4 \cdot V) \cdot \underline{Tc}$. Furthermore, in the latter case the system comprising two transfer media has a minimum second period of time $T_F = (R \cdot V) \cdot \underline{Tc}$.

A suitable construction of a data source and/or a receiver for active participation in communication in the present system is characterized in that the data source and/or receiver includes at least one control input and one control output, for switching over a logic level "ready" on the communication bus to a logic level "busy" via the control output, after detection in the second detecting circuit that said second period of time (for example, $T_B$) has expired; and supplying, via the control output, the logic level "busy" when via the control input the logic level "busy" produced on the bus by another active participant is received and, moreover, the source and/or receiver itself has meanwhile determined, by way of the first detecting circuit, that at least the first period of time (for example, $T_A$) has expired; so that the source and/or receiver can be activated to participate in the execution of a relevant action.

It will occur in practice that said data source and/or receiver is a digital signal processor which comprises programmed functions which include said controls and an input of which acts as said control input while an output thereof acts as said control output.

When use is made of the digital signal processors in the described manner as a data source and/or data receiver, an improvement can be achieved by providing a logic level "ready/busy" transition detector for the source and/or receiver whereby a "ready/busy" transition on the communication bus results in a reduced response time for the issuing of the logic level "busy" on the control output by the data source and/or receiver itself if, moreover, it has meanwhile determined that at least the first period of time has expired. The response time of the source and/or the receiver is thus reduced, so that the communication speed is increased.

In the cases where applicable or economically justified on the basis of the type of data source and/or data receiver, an attractive solution as regards response time can be realized. To this end, the data source and/or data receiver includes a first section and a second section, said first section embodying mainly the source and/or receiver function and being connected, via at least one request output and one acknowledge input, to the second section which comprises a request input and an acknowledge output and furthermore said circuit for determining whether the communication bus is ready for executing an action concerning a communication, for which purpose the second section can be connected to the bus by way of said control input and control output. Moreover, said second section may also include an identity comparison whereby the identity of the data source and/or receiver can be compared with an identity presented via the communication bus.

In a special version of the above solution the circuit in the second section includes a read-only memory, an address counter and a logic AND-function element, the read-only memory being addressable by the address counter. The address counter counts clock signals which are supplied by the first section, via a clock signal generator input, after a request signal has been received via the request input. When the counter position is reached which represents the first period of time ($T_A$), the addressed read-only memory produces an output bit whereby the logic AND-function element is prepared. When the counter position is reached which represents the second period of time ($T_B$), or sooner when via the control input the bus "ready" signal changes over to the bus "busy" signal so that the counter is forced to the counter position of the second period of time ($T_B$), the location of the read-only memory then addressed supplies the logic level "busy" to the control output.

Finally, it is to be noted that the read-only memory which is addressed via the address counter can also be adapted for the execution of the identity check in cooperation with the identity comparison circuit.

The communication bus consists of at least one transfer medium. This is the most advantageous solution, be it that the communication speed is not very high because the clock signal generator tolerances have a strong effect.

Solutions involving more transfer media are also possible by using the induction principle in accordance with the invention. Notably a multi-source/receiver data system is characterized in that the communication bus consists of two transfer media, one of which serves as the control transfer medium while the other serves as the data control medium, at least each active participant comprising a control medium write terminal and a read terminal and a data transfer medium write terminal and a read terminal. A further embodiment is characterized in that the communication bus consists of three transfer media, two of which serve as control transfer medium while the third serves as a data transfer medium, at least each active participant comprising control transfer medium write terminals and read terminals and a data transfer medium write terminal and a read terminal. A further special embodiment comprising a multiple transfer medium is characterized in that the communication bus consists of three transfer media, one of which serves as a control transfer medium while the other two serve as data transfer media, at least each active participant comprising a control transfer medium write terminal and a read terminal and data transfer medium write terminals and read terminals.

BRIEF DESCRIPTION OF THE DRAWINGS

The invention will be described in detail hereinafter with reference to the Figures. It is to be noted that the invention is by no means restricted to the examples described.

FIG. 1 is a flow chart showing a sequence of actions constituting communication via a communication bus.

FIG. 2 is an abbreviated block diagram of a multi-source/receiver data processing system having a transfer medium in the form of a single line.

FIG. 3 shows a time diagram associated with the system shown in FIG. 2.

FIG. 9 shows a flow chart for the execution of interrupts.

FIG. 10 shows a flow chart of a main program.

FIG. 11 shows a flow chart of an interrupt procedure.

DESCRIPTION OF THE PREFERRED EMBODIMENTS

Figure 4:
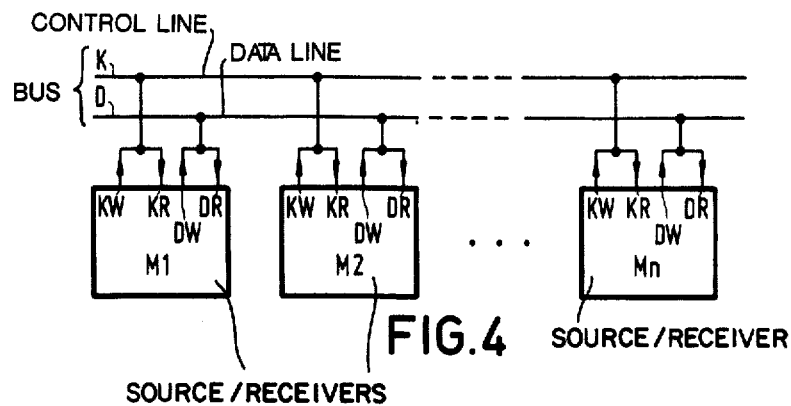
FIG. 4 is an abbreviated block diagram of a multi-source/receiver data processing system having a transfer medium in the form of two lines.

FIG. 1 diagrammatically shows the sequence of actions which may form part of a communication via a bus. The first is "Wait" until the bus is ready for an action concerning a communication (block 20). The bus is considered to be "ready" when it does not exhibit any action for a sufficiently long period of time. It is important that all active participants know this situation "bus ready", so that they can all participate in the next action.

Arbitration (block 22) is the next action which concerns the execution of a selection procedure on the basis of priority and/or identity data. It is determined here which module becomes the master of the system.

Slave selection (block 24): the master issues a destination address. All modules compare this address with their own identity. The source or receiver which detects correspondence considers itself to be the slave. This is the so-called "open-slave" phase.

The source or receiver detecting this correspondence will usually make its own identity known to the master, so that the master can check whether the correct slave has been selected (block 26).

Data transfer (block 28). The data to be transferred is transported via the bus. The slave considers the transfer to be terminated when it detects that the bus becomes free again (no action within a given period of time). Because of the fact that after the arbitration and the slave selection normally a point-to-point connection is present, other time restrictions may also be applicable. These restrictions can be chosen to be optimum for the relevant master-slave configuration, so that a higher data transport speed can be reached. During the data transfer, protection against bit transfer errors can be realized. This can be achieved by means of a so-called "bit-echo" procedure where the receiver re-transmits (echoes) each bit. The source compares the bit transmitted with the bit received.

It is to be noted that besides block 26, block 28 will not always occur. There are cases where a master having carried out the opening of a slave terminates its communication instruction.

In systems in accordance with the invention, the transport of information will generally be realized bit serially via at least one transfer medium. As has already been described, this presents a synchronization problem when no central clock, crystal oscillators or trimming networks can or may be used.

The "induction" principle in accordance with the invention enables the clocks in the system, which may be present per module or possibly per group of modules, to have tolerances. Assume that per active source and/or receiver there is a tolerance $$R: R \frac{T_{max}}{T_{min}}$$

For example, a deviation of from $-20\%$ to $+80\%$ results in an $R=2.25$. Hereinafter, it is assumed that all periods of each active source and/or receiver are proportional to the clock signal generator ($T_c$)-periods associated with the active source and/or receiver.

FIG. 2 shows a multi-source/receiver data processing system, having a transfer medium in the form of a single line. The letter C in FIG. 2 denotes the single-line bus via which a logic level 0 or 1 can be transported. The references M1, M2, ... Mn denote data sources and data receivers. These may be active and passive sources and/or receivers. Because it is not relevant for the description of the invention that in addition to active sources and/or receivers there may also be passive soures and/or receivers, it is assumed hereinafter that only active data sources and receivers are present. These will be referred to hereinafter as modules.

Each module is capable of reading or writing data, or both, from or to the bus line. However, to establish a communication connection all modules must be capable of reading and writing communication control information from and to the bus. To this end, each module includes an output CW for writing to the bus and an input CR for reading from the bus. The information on C is the information on the inputs CR. For writing it is assumed that the bus line C has a wired logic gate function, a wired AND-gate or a wired OR-gate. In view of the examples chosen for the further description and the selected signal definition of the logic level "busy"='low"$=0$ and "free"="high"$=1$, the logic AND-function is used for determining the logic level on the bus. The level on the line C is thus determined by C=CW (M1)·CW (M2) . . . . As is known, a wired AND-gate can be realized by means of open-collector bus drivers.

FIG. 3 shows a time diagram for the example shown in FIG. 2. In this time diagram, C denotes the signals on the bus. CW(M1) and CW(M2) denote the signal states on the write outputs of the modules M1 and M2. In this example it is assumed that both modules request communication. Furthermore, in this example the clock signal generator of the module M1 is faster than that of M2. Viewed in time, the following takes place:

(1) A previous master of the system (a module M) has terminated its use of the bus.

(2) If the logic level of the C-line does not change after a first period of time $T_{A1}$ (so in this case for M1), the bus is considered to be "free" (C=1). If the bus assumes the logic level "busy" (C=0) before expiration of the period of time $T_{A1}$, the bus is considered to be busy. A waiting period until the bus becomes free is then necessary. (See to the left of 1).

(3) After $T_{A1}$, there is a waiting period until the expiration of the second period of time $T_{B1}$ before the module M1 starts to use the bus. This is realized by the supply of a starting bit: CW (M1) supplies the logic level "busy", so that C becomes 0. Meanwhile, module M2 has passed its first period of time $T_{A2}$ and it detects (and this happens later, after the period $T_B$ has elapsed) on line C that C becomes 0. The module M2 reacts thereto by outputting the logic "busy" level via its output CW(M2). This does not take place immediately because the module has a response time. This response time is denoted by the reference $T_{R2}$. Said periods of time, the response time and the tolerances of the clock signal generators which influence the whole procedure will be dealt with hereinafter to provide an insight into the interdependence.

The part between (1) and (3) is denoted by the letters WBF in FIG. 3, which concerns the action "waiting until the bus is ready", i.e. the issuing of all requests (start) by all active participants.

(4) The start bit has a duration (T11) (module M1) or (T12) (module M2), respectively. On line C this is Tsb in view of the wired AND-function. Subsequently, a data bit (level high or low) is applied to the bus. This is done by the active participant module M1 as well as by M2. The first data bit applied is the bit of highest order of the identity of each of the modules M1 and M2.

(5) At the instant t=T21, the data bit on C is read by the module M1. At the instant t=T22, this data bit is read by the module M2. So, reading takes place later in M2 in view of its slower clock.

This part of the communication concerns the action for executing a selection from the active participants on the basis of identity data. The master is thus determined. This is also referred to as arbitration. The modules compare their bits by way of the wired AND-function: first their bit of highest order and the result thereof is that a presented "low" signal overrules a presented "high" signal. As soon as an active participant detects, via its read input, that a "high" signal applied thereby is obviously made "low" by another signal, this participant withdraws its participation, thus accepting that it has lost the arbitration. During the next phases, this module is no longer an active participant and keeps its output at the logic level "high": CW(M)=1 (like all other non-participants).

(6) After T31 or T32, a stop bit is despatched (by the participants still active). This bit is a logic "high" signal.

(7) As from a further first period of time $T_{E1}$ or $T_{E2}$, the (still) active participants check whether a transition occurs on the line C: C=1→0. This indicates a new start bit. This part of the procedure concerns the treatment of the first data bit: TFB in FIG. 3.

(8) The waiting sub (7) lasts until a further second period of time ($T_{F1}$) has expired. The "induction" principle again operates. After $T_{E1}$ (for module M1) and $T_{E2}$ (for module M2), which periods can again be denoted as a first period of time, a waiting period expires until one of the two modules passes its own second period of time $T_{F1}$ and $T_{F2}$, respectively. Module M1 first reaches its $T_{F1}$ (faster clock) and a new start bit then appears on the line C for both modules. However, as mentioned sub (3), module M2 lags slightly: after its response time $T_{R2}$.

After $T_{F1}$, a transition occurs C=1→0: a new start bit. From then on all phases (4)-(8) are completed again, TSB treatment of the second data bit, etc. This is repeated at least until all data bits required for establishing the communication connection have been dealt with. Reference is again made to the blocks and the description given with reference to FIG. 1, where the fact is mentioned that, once the connection has been established, the time restrictions may change so that a faster point-to-point data transfer between a master and a slave is possible.

An explanation of the relationship between the above periods of time is important for a proper understanding of the invention. The following can be calculated for the embodiment described with reference to the FIGS. 2 and 3. Assume that Tc is the local clock signal generator period of a module M. The design of a module is assumed to be such that all relevent periods of time are derived from said period Tc;

$$T_R = a_R \cdot Tc; \quad T_A = a_A \cdot Tc; \quad T_B = a_B \cdot Tc; \quad T1 = a1 \cdot Tc;$$
$$T2 = a2 \cdot Tc; \quad T3 = a3 \cdot Tc; \quad T_E = a_E \cdot Tc; \quad T_F = a_F \cdot Tc \quad (1)$$

Therein, the symbols aji are constants. $a_A$ and $a_E$ are internal preparation time factors. $a_A$ concerns the number of clock periods required by a module M for requesting a communication connection. $a_E$ concerns the number of clock periods required by a module M for presenting a stop bit (after T31) after a data bit. In order to achieve the described object, i.e. a proper communication connection by means of a single line without severe requirements being imposed on the clocks in this system, the symbols $a_B$ and $a_F$ should apply to the entire system and not only per module M. This is because the said second periods of time $T_B$ and $T_F$ are critical for a proper execution of the actions. The conditions to be satisfied by $a_B$ and $a_F$ will be derived hereinafter.

The time diagram of FIG. 3 shows the conditions to be satisfied for a proper execution of the actions:

$$\overline{T}_R < \underline{T1} \quad (2A)$$

$$\overline{T1} < \underline{T2} \quad (2B)$$

$$\overline{T2} < \underline{T3} \quad (2C)$$

$$\overline{T3} < \underline{T_F} \quad (2D)$$

$$\overline{T}_E < \underline{T_F} \quad (2E)$$

$$\overline{T}_F < \underline{T_A} \quad (2F)$$

$$\overline{T}_A < \underline{T_B} \quad (2G)$$

wherein
$T_R = \max (T_{R1}, T_{R2} \ldots T_{Rn})$
$T1 = \min (T11, T12 \ldots T1n)$
$T1 = \max (T11, T12 \ldots T1n)$
$T2 = \min (T21, T22 \ldots T2n)$ etc.

Therein, $\overline{T}$ means a maximum period of time and $\underline{T}$ a minimum period of time. The tolerance factor $R = T_c \overline{T_c}$ is defined. Using this value and (1) and (2):

$$a1/a_R > R \quad (3A)$$

$$a2/a1 > R \quad (3B)$$

$$a3/a2 > R \quad (3C)$$

$$a_F/a_E > R \quad (3D)$$

$$a_A/a_F > R \quad (3E)$$

$$a_B/a_A > R \quad (3F)$$

and, moreover, $$a_E > a31 \text{ (at least unequal)} \quad (3G)$$

Assuming that normally an as high as possible communication speed will be desired, (3A-3F) with (3G) can be written as follows:

$$a1 = R \cdot a_R \quad (4A)$$

$$a2 = R \cdot a1 \quad (4B)$$

$$a31 = R \cdot a2 \quad (4C)$$

$$a_F = R \cdot a3 \quad (4D)$$

$$a_A = R \cdot a_F \quad (4E)$$

$$a_B = R \cdot a_A \quad (4F)$$

It follows therefrom that:

$$a_F = R^4 \cdot a_R = R^4 \cdot V \quad (5A)$$

$$(a_A = R^5 \cdot a_R = R^5 \cdot V \quad (5B)$$

$$a_B = R^6 \cdot a_R = R^6 \cdot V \quad (5C)$$

and $$a_E > R \cdot a_R \quad (5D)$$

This is applicable per module. Because for these symbols it is important to make the actions (bus "ready", "selection of master") perfect for the entire system, the highest value of $a_B = a_B$ and $a_F = a_F$ must be chosen as the system constant from the set of associated products. Therefore, the largest product of the factors R and V from the set of all products of R and V of the modules is decisive. Modules having a large clock tolerance and a long response time produce large products of R and V, but modules having a small clock tolerance and a very long response time and vice versa also produce large products of R and V. This largest product is denoted as R·V. The dependencies of the second periods of time are thus fixed:

$$a_B = R^6 \cdot V \text{ and } a_F = R^4 \cdot V \quad (6)$$

Thus, $$T_B = R^6 \cdot Tc \text{ and } T_F = R^4 \cdot V \cdot Tc \quad (7)$$

Therein, $V = V_p$, the response time factor of the given module $M_p$ for which the largest product V·R is formed with $R_p = R$ of this module. The response time of this module is $T_{Rp} = V \cdot Tcp$. Therefrom, the smallest possible two periods of time $$\underline{T}_B = R^6 \cdot T_{Rp} \text{ and } \underline{T}_F = R^4 \cdot \underline{T}_{Rp} \text{ follow} \quad (8).$$

The $T_F$ is a measure for the minimum cycle ("frame") duration for the communication of a data bit during an action concerning a communication.

In practice, the internal response time $T_R$ of a module M cannot be indefinitely minimized; this depends on the selected implementation. In the case of communication with a programmed microprocessor, a $T_R$ of, for example, 10 microseconds is feasible nowadays. In the case of full hardware realization of the circuit, for example, 2 microseconds—0.2 microsecond seems feasible for $T_R$. In the case of crystal-controlled clocks, R is very near 1, but if use is made of inexpensive clocks, for example, simple RC-oscillators (which is assumed in this content), R may be a factor 4 or even more.

Numerical example of a feasible situation: Assume $R = 4$ and $T_{Rp} = 10$ microseconds. $\underline{T}_{Bp} = 4^6 \cdot 10 \approx 40$ ms and $\underline{T}_F = \underline{T}$ (frame) $\approx 2.6$ ms, so $T$(frame) $= R \cdot T \cdot ($ frame$) = 10.4$ ms. $T_{Bp} = 160$ ms.

As a worst case, the communication speed in the case of an action is then approximately 99 Baud.

If $T_{Rp} = 2 - 0.2$ microseconds (due to hardware provided for this purpose, see FIGS. 14 and 15), the lowest speed is increased to some 500–5,000 Baud.

It is to be noted that the $T_R$ can be reduced also when the procedure is controlled by means of a programmed signal processor. To this end, a simple "high/low" level detector can be included between the bus line C and the module. The detector operates as follows: as soon as the bus changes to "low" (C→0), it sets the CW(M) to 0 via a circuit.

It is to be noted that it follows from the foregoing that for the definition of the system in accordance with the present application the largest permissible product (R·V) can be determined. In other words, taking into account a "worst" permissible module yet being included in the system, the certainty that the procedure will be correctly executed is given by taking into account the product (R·V).

FIG. 4 shows diagrammatically a multi-source/-receiver data processing system in which the single-line bus of FIG. 2 is extended with an extra line. This two-line bus, each line of which is suitable for the transport of a logic level 0 and 1, is less inexpensive than the one-line bus but offers the advantage that a higher communication speed can be achieved. M1, M2, ... Mn again denote modules which can act as active participants. K is a control line and D is a data line. Each module has a write output KW to the control line and a read input KR from the control line K. Each module furthermore has a write output DW to the data line and a read input from the data line D. Both lines have the wired AND-property: K=KW(M1)·KW(M2) ... and D=DW(M1)·DW(M2) ....

Figure 5:
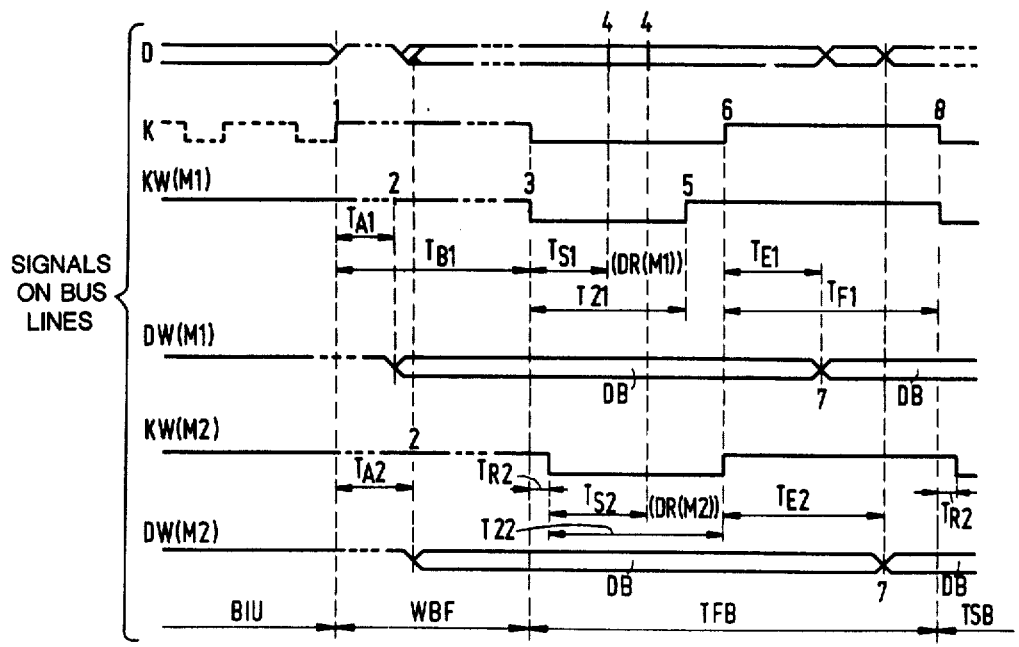
FIG. 5 shows a time diagram associated with the system shown in FIG. 4.

FIG. 5 shows the time diagram associated with the system shown in FIG. 4. In principle more or less the same happens as in the case of FIG. 3, the distribution of the actions among the lines K and D being the essential difference. It is again assumed that the module M1 is faster than M2. Viewed in the time, the following takes place:

(1) A previous master has terminated the use of the bus. All active participants start counting down the period $T_{A1}$, awaiting whether the bus is "ready" (C=1).

(2) If the K line does not change its logic level after the first period of time $T_{A1}$ (in this case for module M1 the $T_{A1}$), the bus is considered to be "free". When the bus assumes the logic level "busy" (K=0) before expiration of the period of time $T_{A1}$, the bus is considered to be in use. A waiting time then expires until the bus becomes free. In FIG. 5 the busy state of the bus is denoted by the reference BIU. When the bus is ready (after $T_{A1}$), a data bit (DB) is applied to the line D via output DW(M1) at (2). The same is applicable to the module M2 after the expiration of its first period of time $T_{A2}$. Via output DW(M2) a data bit (DB) is applied to D. The wired AND-function of the line D determines the result of the two applied data bits (a "0" erases a "1").

(3) The module (in this case M1), which first detects that its second period of time $T_B$ (in this case $T_B$) has expired applies a logic level 0 to the K line via the write output KW(M1), K becomes 0. Other modules which have meanwhile detected the expiration of their first period of time $T_A$ react thereto, "induction", and also write (after their response time $T_R$) a 0 on the K line. In FIG. 5 at (3) after $T_{R2}$ a 0 is written on the line K via write output KW(M2). This phase is the action wait-until-bus "ready", WBF in FIG. 5.

(4) After the above K→0 action, the data line D is sampled. Each module participating in the action samples the line D after a time $T_S$ (the differences are caused again by the clock tolerances). The level of line D is thus applied to the modules via their inputs DR(M1) and DR(M2).

(5) After the sampling, all relevant modules supply a logic level 1 to the K line via their output KW(Mi). Module M1 does so after the period of time T21. M2 and any other modules do so at other instants T2, where:

(6) at the instant (6) all modules have made the line K=1 via their output KW(Mi). The line K is then also at the level 1 (wired AND).

(7) After having detected the transition (6), all active participants apply a new data bit (DB) to the line D. Module M1 does so after the period of time $T_E$ after the instant (6), $T_E$ is a period of time required in the module Mi for applying a new data bit to the line D. Other modules do the same, in any case before expiration $T_F$. $T_E$ and $T_F$ are said first and second period of time again. Thus, "induction" again occurs.

(8) After the second period of time $T_{F1}$, the line K again becomes 0. At this instant it is sure that all active participants have applied their new data bit to the line D. (Module M2 did so at 7), see line DW(M2) in FIG. 5). The wired AND-function of the data line D again determines the result of the applied data bits. The phase between (3) and (8) is the action for the communication of the first bit, denoted by TFB. The phases (4)–(8) are completed as many times as necessary for establishing the communication connection, which means at least until the arbitration and "open slave" phase has been completed: communication of the second bit (TSB) etc. For this example a calculation of the periods of time in relation to the clock signal generator tolerances is again given. Tc is again the local clock period of the module M. All relevant periods of time are derived from this period per module.

$$T_R = a_R \cdot Tc; \quad T_A = a_A \cdot Tc; \quad T_B = a_B \cdot Tc;$$

$$T_s = a_S \cdot Tc; \quad T_2 = a_2 \cdot Tc; \quad T_E = a_E \cdot Tc;$$

$$T_F = a_F Tc. \tag{1}$$

Therein, the symbols aj are constants. $a_A$ and $a_E$ are again internal preparation time factors. $a_A$ concerns the number of clock periods required in a module M for a request for establishing a communication connection. $a_E$ concerns the number of clock periods required by a module Mi for applying a new data bit (after the fetching from, for example, a memory) to the bus. Like before, $a_B$ and $a_F$ must be applicable to the entire system rather than per module. Hereinafter, the conditions to be satisfied by $a_B = a_B$ and $a_F = a_F$ will be derived for the two-line system.

The time diagram of FIG. 5 enables proper execution of the action only if the following requirements as satisfied:

$$\overline{T}_{R1} < \underline{T_2} \tag{2A}$$

$$\overline{T}_E < \underline{T_F} \tag{2B}$$

$$\overline{T}_F < \underline{T_A} \tag{2C}$$

$$\overline{T}_A < \underline{T_B} \tag{2D}$$

Using the defined R = Tc/Tc, the following can be derived from (1) and (2):

$$a_2/a_R > R \tag{3A}$$

$$a_F/a_E > R \tag{3B}$$

$$a_A/a_F > R \tag{3C}$$

$$a_B/a_A > R \tag{3D}$$

In view of the fact that normally a situation with the highest possible communication speed will be desired, (3A–3D) can be written as:

$$a_2 = R \cdot a_R \tag{4A}$$

$$a_F = R \cdot a_E \tag{4B}$$

$$a_A = R \cdot a_F \tag{4C}$$

$$a_B = R \cdot a_A \tag{4D}$$

It follows therefrom that $$a_F = R \cdot a_E = R \cdot V \tag{5A}$$

$$(a_A = R^2 \cdot a_E = R^2 \cdot V \tag{5B}$$

$$a_B = R^3 \cdot a_E = R^3 \cdot V \tag{5C}$$

It thus appears that the response time factor $V = a_{E1}$ is the preparation time factor for the presentation of a new data bit.

Like previously for the one-line system, the constants $a_B = a_B$ and $a_F = a_F$ again have to be selected as the highest value of the product (R·V) from the set of products (R·V). The dependencies of the second periods of time are thus affixed:

$$a_B = R^3 V \text{ and } a_F = R \cdot V \tag{6}$$

Therefore, $$T_B = R^3 \cdot V \cdot Tc \text{ and } T_F = R \cdot V \cdot Tc \tag{7}$$

Therein, $V = a_{Ep}$ (= Vp) is the preparation time factor of the module Mp for which the largest product (R·V) is formed. The response time of this module is ("ready" time) $T_{Ep} = V \cdot Tcp$.

The smallest possible second periods of time are then:

$$\underline{T_B} = R^3 \cdot T_{Ep} \text{ and } \underline{T_F} = R \cdot T_{Ep} \tag{8}$$

As regards the minimum cycle (frame) period for the communication of a data bit during an action, it follows (see also FIG. 5) from (8) and (4A) with (1):

$$T(\text{frame}) = \underline{T_F} + T_{2p} = R \cdot T_{Ep} + R \cdot T_{Rp},$$

so that $$T(\text{frame}) = R(T_{Ep} + T_{Rp}) \tag{8A}$$

Assume, as will often be the case in practice, that $T_{Ep} = T_{Rp}$, so that $\underline{T(\text{frame})} = 2R \cdot T_{Rp}$. This is more favorable than in the case of the one-line system. A relationship exists with respect to R instead of to $R^4$. In the case of R = 4, this already makes a difference of a factor 64. Taking into account the 2R, this is thus a factor 32.

A numerical example: assume R = 4, $T_{Rp} = 10$ microseconds (so $T_{Ep}$ is also 10 microseconds). $\underline{T(\text{frame})}$ is then $2 \cdot 4 \cdot 10 = 80$ microseconds, and $T_{Bp} = 640$ microseconds. The worst case is then: $\overline{T(\text{frame})} = R \cdot \underline{T(\text{frame})} = 320$ microseconds, which means a lowest communication speed of approximately 3000 Baud.

The speed can again be increased by simply arranging a "high/low" level detector between the K line and the module inputs KR(M). As soon as a 1→0 transition occurs, the detector circuit ensures that the line K becomes 0. The response time $T_R$ is thus substantially reduced.

During the data communication phase (after the establishing of a communication connection), a module acts as a transmitter (source) and another module receives the data (receiver). It may be necessary to protect the data transport against communication errors. This can be realized by making the receiver return each bit received ("echo"). The transmitter verifies the bit received with the bit just transmitted. This alternating transmission and reception of the data bits of course, reduces the communication speed.

The described one-line and two-line systems offer an ample illustration of the "induction" principle. It is to be noted that a number of lines can be readily increased: for example, a three-line system in which there are two control lines and one data line. The induction principle can then also be used. However, the efficiency decreases, because the increasing number of lines has a cost inceasing effect, which is contrary to the aim of the present system. Even though the communication speed is further increased in the three-line system, the simplicity is lost. In the three-line system, communication errors can be detected in the same manner as described above for the two-line system.

Figure 6:
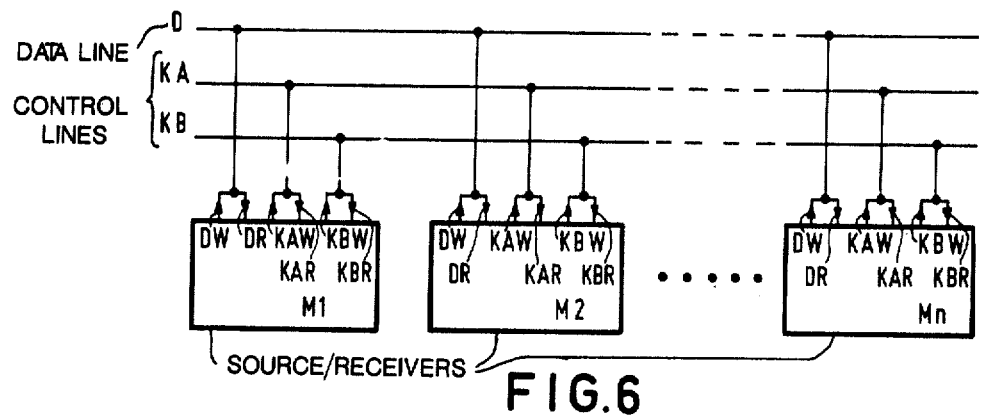
FIG. 6 shows a system having a transfer medium in the form of three lines.

FIG. 6 illustrates a system having a transfer medium formed by three lines. There are two control lines KA and KB and one data line D. The modules M1, M2, ... Mn have terminals via which they are connected to these lines. One output terminal KAW(M) whereby control data is written from module M to the line KA and an input terminal KAR(M) via which control information is read by module Mi from the line KA. Similarly there are provided an output terminal KBW(M) and an input terminal KBR(M) for the writing on and reading of the control line KB. Furthermore, each module comprises a data line write terminal DM(M) and a data line read terminal DR(M). In view of the time diagrams of the FIGS. 3 and 5, an associated time diagram will be self-explanatory and will not be described herein.

The foregoing can be summarized as follows.

As has already been stated in the preamble, at least four lines are required for an asynchronous communication on a bus. When fewer lines are available, time-dependent determinations must be introduced.

The present application offers the time-dependent determinations and a simple solution for communication via buses having at least one transfer medium. It is to be noted that the invention is not restricted to one-line, two-line or three-line buses, but in practice the four-line solution with a handshake procedure will usually be preferred in the case of more than three lines. The communication speed in the present systems is greatly dependent on the worst case clock inaccuracy of the modules. The one-line system is very simple and cheap for applications in consumer products. However, it has the drawback that a receiver cannot reduce the speed of the source from which it receives data. The two-line system has an additional line which not only enables a higher communication speed, but also mitigates the drawback of the one-line system. This is because (see FIG. 5) a master as well as a slave module of the system can reduce the data speed by maintaining the line K at 0 for a chosen period of time (instant (6) is then shifted to the right in FIG. 5). The three-line system generally does not produce a communication speed which is twice as high. Therefore, when three lines are available, the system utilizing the two-line principle is to be preferred: one line is then the control line and the two other lines serve as two parallel data lines.

Figure 7:
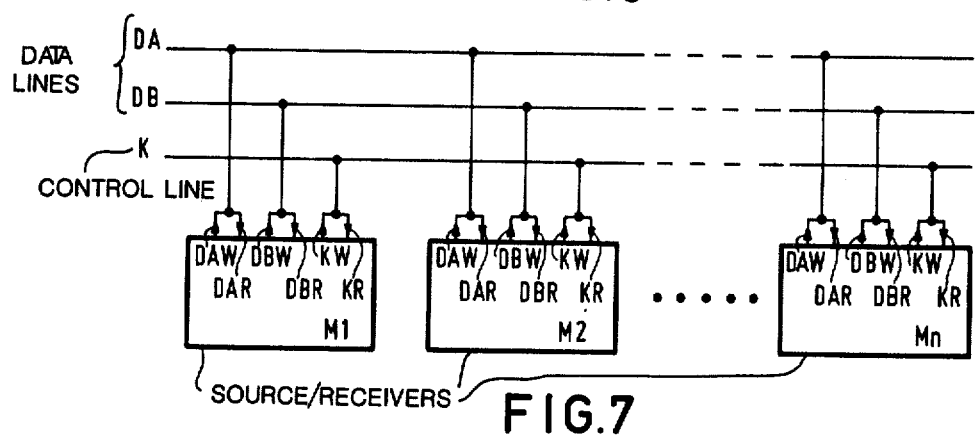
FIG. 7 shows a slightly modified embodiment of the system of FIG. 6 having a transfer medium in the form of three lines.

This type of three-line bus is illustrated in FIG. 7. There are provided one control line K and two data lines DA and DB. The modules M1, M2, ... Mn have a control line write terminal KW(M) and a control line read terminal KR(M). For each of the data lines they have data line write terminals DAW(M) and DBW(M) and data line read terminal DAR(M) and DBR(M).

Figure 8A:
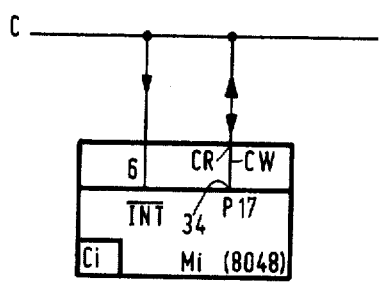
FIGS. 8a and 8b show embodiments of modules which are constructed as digital signal processors.
Figure 8B:
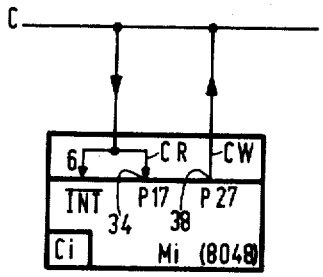
Figure 12:
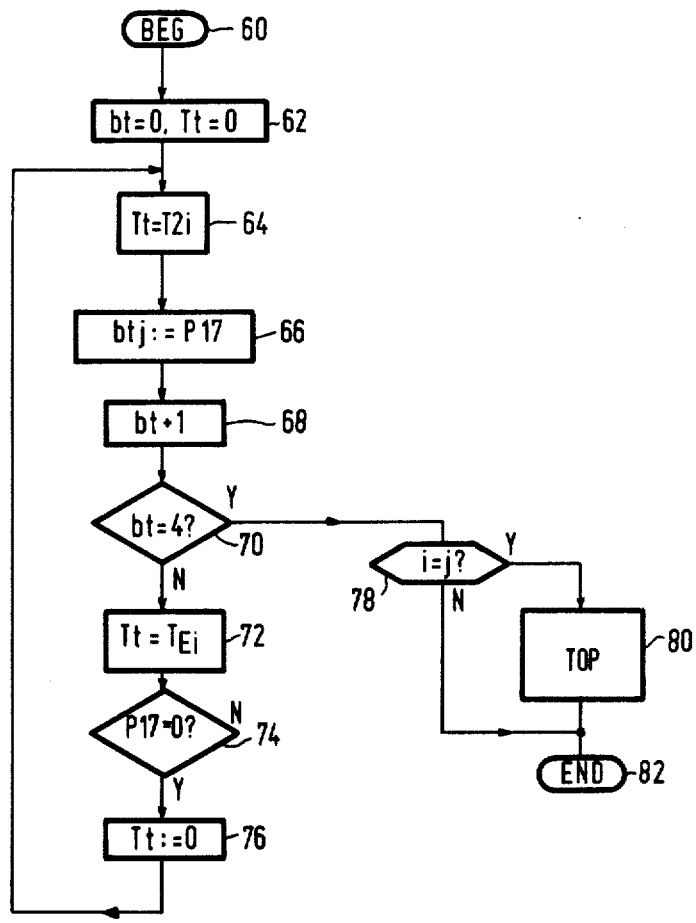
FIG. 12 shows a flow chart of a detailed interrupt procedure.

The following is a detailed description of embodiments of a multi-source/receiver data processing system in which the bus consists of a single transfer medium. FIG. 2 shows the general diagram of such a system. The modules Mi may be digital signal processors. These processors have their one memories and can perform given tasks. When communication with other modules is required, the bus is utilized. The processors having memories are preferably of the type in which so-called microprocessors are used as the processor. When they include memories, arranged on the same chip or not, these modules are also referred to as microcomputers. An example of such a microcomputer is the type 8048 by Intel (MCS-48 Microcomputer User's Manual, Intel Corporation, 1977, p. 6-1). An input/output terminal (I/O), for example terminal 34, thereof can be used as the write output CW as well as the read input CR. (See the program). Use can alternatively be made of two terminals: an I/O terminal 34 (P17) as CR and an I/O terminal 38 (P27) as CW. Furthermore, a processor of this kind requires a separate input terminal (No. 6) for receiving interrupts ($\overline{INT}$). This can also be considered to be CR, be it for a given purpose which will be described hereinafter (FIGS. 11 and 12). FIG. 8 shows the foregoing again: Ci in the FIGS. 8a and 8b denotes clock signal generators.

FIG. 9 shows how a processor having an interrupt input $\overline{INT}$, for example the 8048, can execute interrupts. From SRT=start in block 30, the question is asked, is there an interrupt INT (block 32)?. If negative (N), an instruction of the main program is executed, MPI in block 34. After that it is checked again (back to block 30) whether there is an interrupt. If there is an interrupt (Y), the interrupt program is completely executed, IPIS (block 36). After that, it is again checked whether there is an interrupt (block 22), etc. This method of interrupt execution is a specific property of the 8048.

A microprocessor such as the 8021 by Intel which does not know an interrupt, has an input terminal which can be defined as interrupt, so that the interrupt operation can be included in the total program.

FIG. 10 shows a flow chart of a feasible processor main program. Such a main program may be of any type and in the described embodiment it consists of the following steps Block 38 start BEG. This is followed by initialization INIT, block 40. In block 42 local operations LOP of the main program are executed. It is checked each time whether there are interrupts (see FIG. 9). When the main program reaches a position where communication with another module is required, the processor, in this position submits a request for communication, REQ. This means that this module wishes to become the master of the system. This request must be dealt with. This can only be done if the bus is "ready" for this action. This check is made in block 44, RDY?. In this example, these are the circuit HS. When the bus is "ready", the acknowledge signal (ACK) for the action is given (Y of block 44). This block 44 is of major importance, because it is the subject of the present application. Block 44 includes the programmed function which are the means whereby it can be determined whether the bus is "ready" for the execution of actions concerning the communication. When the permission is not granted (N of block 44), a new attempt is made, etc. When permission is granted (Y), the system transfer operations TOP for the data transmission, are executed, block 46. At the end thereof, the bus is released again, signal $\overline{REQ}$, and return to block 42. The interrupt input (inputs) is (are) then enabled again for the reception of interrupts (enable interrupts), because these inputs are blocked ("disabled interrupt(s)") during the request for permission (block 44) in order to prevent intermediate interrupts from disturbing the process; see also the description with reference to FIG. 13. When (see dotted part of FIG. 10) a data source and/or receiver consists of a first section and a second section, the first section being a digital signal processor which performs the source and/or receiver function, and the second section, also referred to as arbitrator, comprises the circuit, a request REQ from block 42 will be applied to the arbitrator (block 43). Therein permission is awaited, again see block 44, ACK. After termination of the transfer, the arbitrator releases the bus again: $\overline{REQ}$(-block 48). This should also be detected by the arbitrator, block 50. If yes (Y), ACK becomes $\overline{ACK}$ and the process returns to block 42. If no (N), 48 is repeated. It is to be noted that said block 44 is so important because the conflict as to who will be master arises when several modules arrive in their relevant block 44. It is important that a slow module is not pushed aside by a faster module. Therefore, the described "induction" is necessary. The operation thereof will be described in detail hereinafter (see FIG. 13 and FIG. 15 with FIG. 16).

The fact should also be noted that when a module is the master, it indicates a slave. To this end, it is despatches an identity of the slave and tries to interrupt the slave. This is why the INT inputs are shown in the embodiments of the FIGS. 8a and 8b. FIG. 11 shows what happens. In block 52, the interrupt INT appears which is applied by the master to all other sources and receivers via the bus. (In practice, it is INT as the signal $\overline{INT}$ in view of the notations, inputs $\overline{INT}$). In block 54, all sources and receivers compare the presented identity i with their own identity i. If no (N), the interrupt is terminated: END, block 58. If yes (Y), the transfer operation TOP (for example, receiving) is executed in block 56. After termination, END follows, block 58.

Block 54 contains the identity comparison for the slave selection. This will be described in detail hereinafter in FIG. 12.

Block 60 is the beginning BEG. In block 62 a bit counter position bt becomes 0 and the time counter position Tt becomes 0. In block 64 there is a waiting period until a period of time Tt = T21 (assume M1 is the relevant module) (see T21 in FIG. 3) has expired. At T21, an identity bit present on the bus is sampled as a data bit, block 66. This is bit bt of the identity j which is applied from terminal P 17 (see FIG. 8) into a register of the processor, btj: = P17. The bit counter is incremented by one, bt+1, block 68. In block 70 it is checked whether the number of desired identity bits (or more if desired for other purposes), for example, bt=4, has been reached. If not (N), there is a waiting period until Tt = $T_E$ (see FIG. 3), block 72. As soon as the change over of the bus C to "0" is detected (block 74) (P17 must be 0) (see FIG. 3, $T_{FI}$), a new start is made, counter Tt, =0 (block 76) and back to block 64. When the number bt=4 is reached, block 70 (Y), the content of the register in which the identity j is stored is compared with the identity of the relevant module, block 78. If $i \neq j$, it is not intended to be a slave and the interrupt program stops: END, block 82 ( = block 58 of FIG. 11). If i=j, this module is selected as the slave and the transfer operation TOP will be executed, block 80 (block 56, FIG. 11). This is followed by block 82, END.

Thus, for slave selection any source and receiver other than the master itself is interrupted and force to perform the identity comparison. This is time consuming. The sources and receivers which detect $i \neq j$ have been interrupted in vain, so the interruption of their main program is unnecessary. This drawback can be mitigated by the introduction of a so-called conditional interrupt mechanism. The identity comparison is then performed without direct interruption of the processor itself. If i=j indeed, there is an interrupt of the processor itself. Said conditional interrupt mechanism is described in Applicant's previous U.S. patent application, Ser. No. 189,285, filing date Sept. 22, 1980, and can be adapted in a system of the present kind for the slave selection by those skilled in the art.

Figure 13:
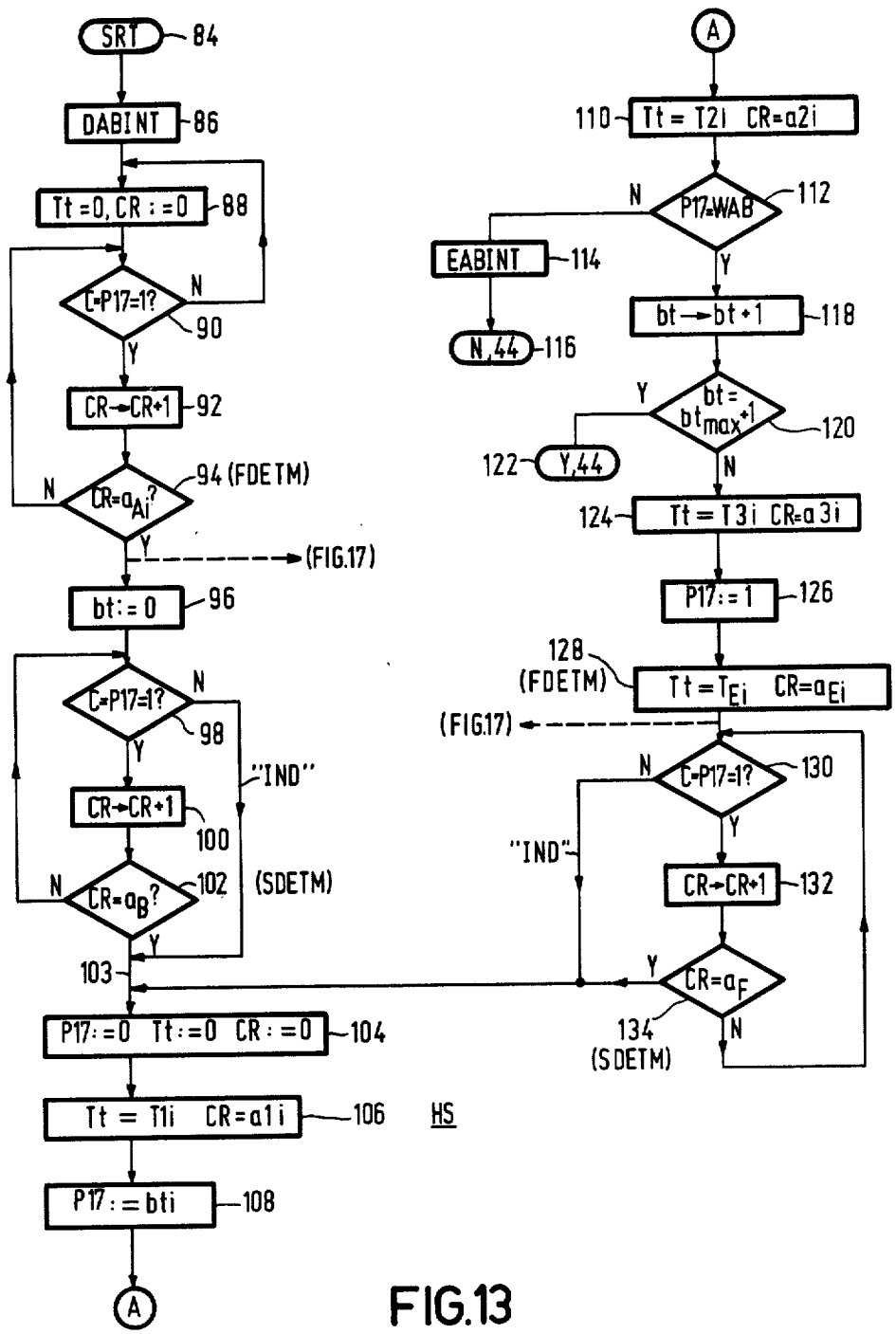
FIG. 13 shows a flow chart of the bus "ready?" test.

FIG. 13 shows a flow chart of the bus "ready?" test (block 44 of FIG. 10). In this example, use being made of a digital signal processor, wherein the said circuit HS are thus represented by a programmed function, the functioning of HS is illustrated. The start is indicated with SRT by REQ (see FIG. 10), block 84. In block 86 the interrupt input (inputs) are disabled, DABINT. It is thus prevented that a module is interrupted when the module itself performs an action in order to make a request. In block 88 the time is reset, Tt=0. This is realized by the resetting of a counter CR to 0 (CR =0). In block 90 it is tested whether the line C which enters via the terminal P17 has the level "1". If not (N), the bus is busy and another attempt is made by returning to the block 88. If P17 = 1 (Y) in block 90, the counter CR is incremented by one by means of the clock signal generator for this module Mi, CR = CR + 1 (block 92). In block 94 it is tested whether the counter position CR = $a_A$ has been reached. This $a_A$, therefore, again is the previously mentioned time factor $a_A$. If CR = $a_A$, Tt = $a_{Ao} \cdot Tc = T_A$, the so-called first period of time. Block 94 thus contains the first detector, FDETM for the first period of time $T_A$. If this position CR = $a_{Ai}$ has not yet been reached (N), the program returns to the block 90. If $a_A$ has been reached, the module is ready for the action. In block 96 the bit counter bt is set to 0, bt = 0; furthermore, it is checked (block 98) whether the line C still carries a "1" so that it indicates busy, in this case "bus ready". If line C and hence P17=0 (N of block 98), the bus is "ready" and the next action may commence. As long as C remains 1 in block 98 (Y), the counter CR→CR + 1 (block 100). In block 102 it is checked whether the position CR = $a_B$ has been reached. If (Y), Tt = $T_B$ = $a_B$Tc. Block 102 thus contains the second detector SDETM. This position $a_B$ will, therefore, be stored as a system constant in the memory of the processor (like the above $a_A$ which, however, is a data of the module M itself). When the position $a_B$ has been reached (Y), the next action may be started. As long as this position has not yet been reached (N), the program returns to 98. It is checked again whether C = P17 has already become "0". This may have occurred in the meantime because in another module the second period of time $T_{Bi}$ has meanwhile expired. If yes (which means N in this case), this action "bus ready" is terminated. (Point 103 in FIG. 23). If no, which means P17=1(Y), CR is incremented by one again etc. The line "IND" in FIG. 13 thus concerns the so-called induction. The counter CR does not advance to $a_B$ if previously another module has reached its period of time $T_{Bj}=a_B\cdot Tcj$ and signals this by making C=0=P17. If Mi has meanwhile passed at least $T_A=a_A\cdot Tc$, it also detects that the bus is "ready". All requesting modules (REQ) have then terminated their action concerning the making of a request (start). This is the point (3) in FIG. 3. Thus bus is C=0. The next action may commence after the relevant processors, detecting this C=0, have set their write output (P17 or, for example, P27) to 0 (block 104). The next action, starting with a start bit, concerns the determination of the master of the system on the basis of priority and or identity data. In block 104 not only the write output CW (referred to hereinafter as P17, see also FIGS. 8a and 8b) becomes 0, but also the time=0 by the resetting of the counter CR=0. The counting of the time starts again. A waiting period expires until Tt=T1=a1Tc (for the start bit), block 106. The write output CW (P17) then supplies the first data bit of the identity and/or priority P17:=bti (block 108). An encircled A at the bottom points to the encircled A at the top where the process continues. In block 110 a waiting period expires until Tt=T2. CR is then a2i. This is point (5) in FIG. 3 where the line C is sampled. In block 112 it is detected what is carried by the line C the wired AND of the applied bits bti etc., denoted by P17=WAB. Read input CR (P17) reads this. When all relevant (in this case first) bits are equal, Y of block 112 is the output for all modules. However, if this bit of one or more modules is 0 and while it is 1 for the other module (modules), the arbitration is lost by the latter module (modules) and they arrive at output N of 112. The modules no longer participate in the selection of the master. This is executed per bit of the identity and/or priority, so that ultimately one remains as the master. After N of block 112, the interrupt (interrupts) of the module (modules) is (are) unblocked again in block 114 so that they are enabled again, EABINT. Thus, for this (these) module (modules) the actions for establishing a communication connection (so as the master) have not had any result, so they reach the situation N of block 44 (FIG. 10) as indicated in block 116 of FIG. 13.

For the modules which are still in the selection process, the process continues via Y of 112. The bit counter is incremented one position bt→bt+1 (block 118). In block 120 it is checked whether the maximum number of priority and/or identity bits (bt max.+1) has already been reached. If yes (Y), the selection process is terminated and the (now sole) module having reached this point is the master of the system: block 122 indicates this by Y, 44, which refers back to the Y output of block 44 of FIG. 10, ACK. The transfer of data may then commence, TOP, etc. of FIG. 10. If the maximum btmax has not yet been reached, (N) block 120, a waiting time expires until Tt=T3=a3Tc, counter CR=a3 (block 124). The bit period of bt has thus expired and the module (M) sets the output P17=1, block 126. This is CW(M)=1 after point (6) in FIG. 3. After a response time $Tt=T_E=a_E\cdot Tc$, it will be certain that this module M has again presented the level C=1 to the C line via P17 as the write output, block 128. Thus, this concern the first period of time for this action with preparation time factor $a_E$. The process waits for this occurrence in block 128, which thus contains the so-called first detector FDETM for this action. In block 130 it is checked whether the C line itself indeed becomes 1 due to the application of the 1 from the write output CW (P17). This is realized via CR (P17) as the read input. If C=P17=1 (Y), no module has yet reached its second period of time $T_F$. The counter CR is again incremented by one: CR→CR+1, block 132. In block 134 it is checked whether the CR position reached has meanwhile become equal to the response time factor $a_F$. Thus, this concerns the so-called second detector SDETM for this action. If this position $a_F$ has not yet been reached (N), it is checked again whether another module has changed, by the reaching of this position $a_F$, the C=P17=1 into C=0 (so block 130 again). If C=P17=1 remains, 132 again etc. When C has meanwhile been made 0 by another module, N of block 130 is applicable. The induction occurs and the process returns to point 103. This is point (8) in FIG. 3. A next data bit is applied. Block 108 supplies the next data bit bt (second etc.) which is evaluated again via the wired AND (block 112), etc. If no other module has previously counted down $a_F$, at a given instant CR=$a_F$ is reached in block 134 in the relevant module. Via Y of 134 this means that point 103 of the process is reached. This continues until either the module is rejected from the selection process N of block 112, or the module is assigned as the master, Y of block 120, which is achieved after comparison of the last bit and it appears in 120 that further selection is not necessary: bt=btmax+1.

Figure 14:
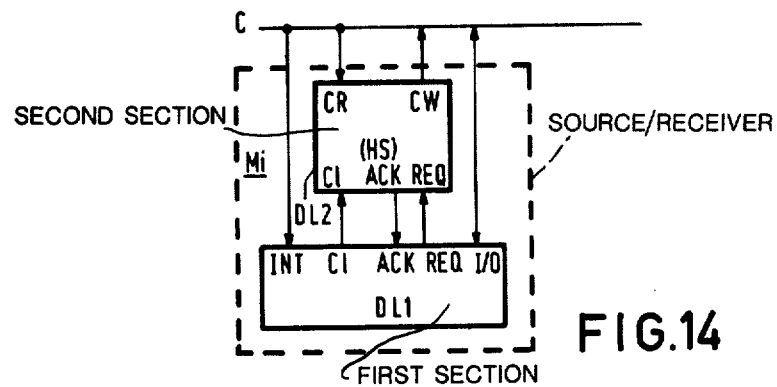
FIG. 14 shows a block diagram of a data source and/or data receiver, consisting of a first section and a second section.

FIG. 14 shows a block diagram of a data source and/or receiver, consisting of a first section DL1 and a second section DL2. DL2 is the section which embodies the source and/or receiver function. Via a request output REQ, DL1 is connected to a request input REQ of DL2. Via an acknowledge input ACK, DL1 is connected to an acknowledge output of DL2. DL2 comprises the HS. The clock signal source for DL1 is connected to DL2 via C1. DL2 is connected to the bus line C via by way of a write output CW and read input CR. DL1 itself is connected to an interrupt input INT and to the bus line C by way of one (or possibly two lines) from input/output terminal (terminals) I/O with form input and output connections. The INT has the same function again as previously, see FIG. 8 etc. The I/O connection becomes effective when the connection master-slave has been established and the data transfer is executed.

The important aspect is that the HS in DL2 are especially designed to enable determination, without involving DL1, whether the bus is "ready" for executing said actions. For the relationship with what happens in the main program of a module M, of which DL2 forms part, reference is made to FIG. 10 and the description of blocks 43, 48 and 50 denoted by broken lines.

Generally, the action concerning the master selection is also incorporated in DL2.

Figure 15:
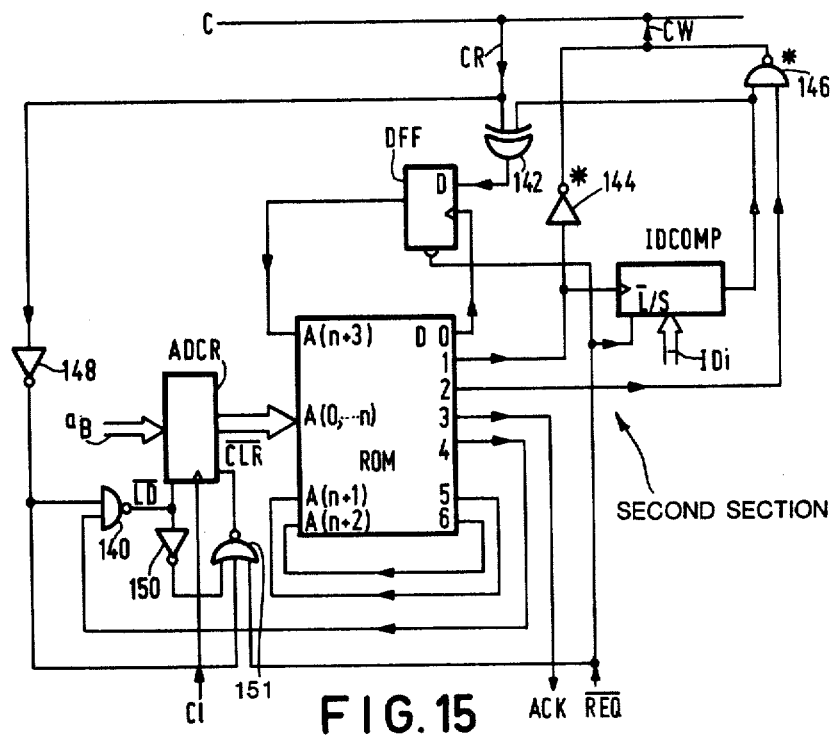
FIG. 15 shows a detailed diagram of the block diagram shown in FIG. 14.

FIG. 15 shows a detailed diagram of the section DL2 of FIG. 14.

Figures 16, 17:
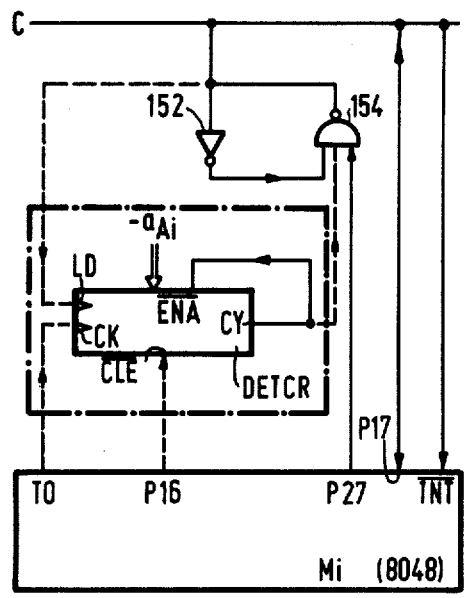
FIG. 16 shows a time bit diagram for the diagram of FIG. 15.
FIG. 17 shows the diagram of a "ready/busy transition" detector.

FIG. 16 shows a time bit (address and data content) diagram associated with FIG. 15.

Instead of an elaborated logic circuit comprising many logic components (such as many gates, two-state elements, etc.), in FIG. 15 a solution is chosen where the said means are: a read-only memory ROM, an address counter ADCR, a logic AND-function element, in this case the NAND-gate 140. Furthermore, in this example arrangements are made so that the selection action can take place in the identity comparator present in the section DL2. This comparator IDCOMP co-operate with the read-only memory ROM addressed by the counter ADCR and a flipflop DFF and an exclusive OR-gate 142. There are also provided an open-collector inverter 144 and an open-collector NAND 146, which together form the write output CW. Elements 148 and 150 are further inverters. 151 is a NOR-gate. The operation will be described in detail with reference to FIG. 16. Therein, the addresses A(0, ... n, n+1, n+2, n+3), the periods of time Tt and the associated time factors $a_A$, $a_B$, a1, ... $a_F$ which represent address parts of addresses A of ROM are stated at the left. At the right there are stated the contents of the memory locations which appear on outputs D0, 1, 2, 3, 4, 5, 6 of ROM in reaction to relevant addressing.

Assume that there is no request: REQ=0. Assume line C=0, so the 0 is present on the output of gate 141, so that $\overline{CLR}$=0, so that any position present on adder ADCR is then cleared. The counter obtains the position A (0 ... n, ... )=0 and hence all outputs receive a 0. If due to A( ... n+1, and/or n+2, ... ) one or more outputs were 1, they are no longer so.

Assume that there is no request: REQ=0 and assume that the line C=1; a 0 is then also present on the output of gate 141 and the same occurs, clear.

Assume that there is a request, REQ=1 and assume that the line C=0 (so "busy"); same as above again.

Assume there is a request REQ=1 and C=1. All inputs of 141 are then 0 (because D4=0, LD=1 so after inverter 150 also a 0 on gate 141), so that $\overline{CLR}$=1 and the address counter ADCR indeed starts to count. The clock pulses via Cl (from the module clock signal generator) are counted. The addresses passed through by ADCR A(0), A(1), etc. still produce a 0 for all D. When line C=1 becomes C=0, the procedure drops back: clearing of counter ADCR. This means that the bus does not permit the request, because it was still busy with a previous communication. It is to be noted that at REQ=1, the identity and/or priority data ID of module i are stored in a register IDCOMP via input $\overline{L}$. Subsequently, this register is enabled, "S", for shifting the content to the right on its clock input $\triangleright$. If REQ=1, C=1 and ADCR reaches the position $a_A$, for which Tt=$T_A$ (see FIG. 3) (the first period of time), a 1 appears on output D4 of ROM, whereby gate 140 is prepared. This means that from this instant the "induction" can occur. The counter meanwhile continues counting, during which no ROM outputs change. When counter ADCR reaches position $a_B$, the period of time Tt=$T_B$, so the second period of time, is reached. In this position, output D1 of ROM becomes 1. Via inverter 144, having an open collector, the line C is made 0 (point (3) in FIG. 3). This also takes place when a 0 is applied, to the line C itself before the position $a_B$. This is possible because another module may have reached its $T_{Bj}$ sooner. Via inverter 148, the NAND 140 is opened (because D4 was already 1) and hence $\overline{LD}$ becomes 0, so that counter ADCR is forcibly loaded with a position $a_B$ ($a_B$ is soldered in the counter and is loaded into the counter on load command). The induction has then occurred and D1=1 will appear, and hence this module will present C=0 via a write output CW. Subsequently, the start bit (piece (3)–(4) in FIG. 3) is transmitted, C=0 until Tt=T1=a1·Tc is passed. The counter ADCR continues from $a_B$. (No clearing occurs, because D4 is 0 again, so $\overline{LD}$=1 and via inverter 150 a 0 on an input of NOR 151, which means $\overline{CLR}$=1).

In position $a_B$+a1 D2=1. Gate 146 thus opens, which means that a (highest order) bit of the identity and/or priority data ID, present in the register ID-COMP, is applied to the line C. Thus, an 1/0 is written as a 0/1 on the line C. (Point (4) in FIG. 3). With the bits of other modules, the wired AND-function occurs on C. During further counting until $a_B$+a2 is reached, ROM always supplies a 1 on its output D2, so that said bit remains presented. Moreover, D0 is also 1 and the flipflop DFF is clocked thereby (it was already prepared by REQ=1). Point (5) in FIG. 3 (sample). The input of DFF carries the signal which is present on the output of the exclusive OR-gate 142. This signal is the result of the exclusive OR-function on the bit which is applied from the module itself from the IDCOMP and the bit which is present on the line C. This may be the same (both 0 or both 1), or different. If the same, a 1 is present on the input of DFF, so that on the output thereof a 1 also appears. This 1 is retained at least for as long as no new D0=1 appears as the clocking pulse. The said 1 addresses ROM on address section A(n+3)=1, so that the total address A(a2,0,0,1) is present. If the bits are not the same, a 0 appears at the output of the DFF and the address section A(N+3)=0. The total address is then A(a2,0,0,0). The foregoing means that in the case of correspondence the arbitration is positive. The module may continue to participate in the arbitration on a next bit. The memory ROM is then addressed in a given section by said A(N+3)+1, so that the module still has a chance of becoming the master. In the case of non-correspondence, the arbitration is negative. The module cannot become the master, because a module (modules) of higher identity number and/or priority also have REQ=1.

Example of arbitration:
identities M1=0 after inversion, applied to line C 10.
identities M2=10 after inversion, applied to line C 01.
identities M3=11 after inversion, applied to line C 00.

For the highest order bit, line C produces 0 through the wired AND. With the IDCOMP, together with DFF and 142, this produces in:
M1 a 0 on output of DFF, so A(n+3)=0 negative.
M2 a 1 on output of DFF, so A(n+3)=1 positive.
M3 a 1 on output of DFF, so A(n+3)=1 positive.
Therefore, only M2 and M3 participate in the further arbitration (for the second bit). For the second bit it is applicable that C=0. Thus, a 0 appears in M2 on the output of DFF, so A(a+3)=0, so negative. It is only for M3 that A(n+3)=1, so positive. M3 is selected. The following takes place in the ROM. In the case of "negative", addressing takes place in the part of ROM for which the address portion A(N+3)=0, during which the address counter counts further. In this part of ROM, in any case D1=D2=D3=0. Thus, no further bits are presented for arbitration. CW is then always 1 and has no further effect. Due to D3=0, no ACK occurs to signify that this module is not granted permission for a data transport as the master of the system. Meanwhile, counting continues on the counter ADCR (all modules; however, only the module (modules) still participating in the further arbitration have an effect on the line C).

The counter ADCR reaches the time Tt=$T_B$+T3, where position $a_B$+a3 is reached (point (6) in FIG. 3). All outputs Do, ... 6=0. On the line C level 1 is present (stop bit after point (5) of FIG. 3). The counter continues to $a_B$+$a_E$ (point (7), FIG. 3). The first period of time $T_E$ after $T_B$ is then reached again. Induction can occur: output D4 = 1, thus preparing gate 140 again. D6 is also 1. The memory ROM thus reaches the part which is addressed by the address part A(n+2) = 1. Therein, the control bits are stored for the treatment of the second bit of the priority and/or identity data. (In this example with D5 and D6, $2^2 = 4$ bits are assumed). The counter ADCR continues until it reaches the position $a_B + a_F$, which means the second period of time $T_F = a_F \cdot Tc$ after $T_B$. Thus D1 = 1 again (and D6 remains 1 in view of the later treatment of the second bit). The second bit is shifted out of the register IDCOMP and is prepared on gate 146. At the same time 0 appears on line C due to D = 1. Via CR, this line applies a 1 to the already enabled gate 140. $\overline{LD} = 0$ again occurs, so that the counter ADCR is forced to the position $a_B$ again. As from this point (point (8) in FIG. 3 the cycle starts again from position $a_B$. The counter advances to $Tt = T_B + T1$ where the second bit of the priority and/or identity data passes via the gate 142 (via D2 = 1) to the line C, etc.

If on the line C as 0 is read via CR before the counter reaches the position $a_B + a_F$, $a_B$ is already loaded into ADCR (induction) and the process proceeds to the new cycle (point (8) FIG. 3). Therefrom, the new cycle for the arbitration of the next bit starts, as above.

When a module obtains each time the result "positive", A(n+3) always remains 1, at the end of the cycle for the last bit (so in this case four) at the address A($a_B + a_F$, 1,1,1) a 1 will be present on output D3, which means ACK = 1, and the module is thus selected as the master.

It will be clear that the response time $T_R$ of the set-up shown in FIG. 5 will be small. This is because the ROM is addressed directly at the location where D1 = 1 in the case of induction in the module M (assume $T_{Bj}$ is reached, which means C = 0 by module Mj). Thus, this module M also causes C = 0. $T_R$ is determined completely by the circuit. This opposes the $T_R$ in example of FIG. 13. The programmed digital signal processor thereof has to perform, either after the block 98 (N) or after the block 102 for the case $T_A/T_B$ and after block 130 (N) or after the block 134 for the case $T_E/T_F$, program steps in order to ensure that a 0 appears on its terminal CW = P17 (block 104) (and for Tt = 0, moreover, the counter becomes CR:=0). This requires more time, $T_R$ thus being larger than when it is determined by the circuitry. In order to solve this problem, a "ready/busy" logic level transition detector can be included between the bus and the programmed digital signal processor used as a data source and/or data receiver.

This is shown in FIG. 17. The detector consists of an inverter 152 and a NAND-gate 154. The inverter 152 receives a signal from the bus line C and the gate 154 receives a signal from the inverter 152 as well as from the processor Mi (8048) by Intel. The outout of 154 is connected to the bus line C again.

The output P27 is in this embodiment a terminal of the processor Mi (in this case the 8048) which is defined during the actions of the present application so that P27 becomes 1 for CR = $a_A$ (block 94, FDETM) and for CR = $a_{Ei}$ (block 128, FDETM of FIG. 13). The following then takes place: gate 154 is prepared. Assume that a 0 level reaches the inverter 152 via C; via 154, a 0 is also applied from this module M to the line C. Therefore: as soon as the line C becomes 0 after $T_A$ or $T_E$ of a module M (by M itself at $T_B$ or $T_F$, respectively, but notably by another module Mj at $T_{Bj}$ and $T_{Fj}$, respectively), M ensures that C becomes 0. $T_R$ is thus reduced.

The terminal P27 is further defined so that it becomes 0 again when the processor supplies a 0 at pin P17 (P17:0) (block 104), so that the detector has no further effect (always 1 supplied from the output of gate 154).

It is to be noted that, obviously instead of using a terminal (P27) a solution can be chosen where the gate 154 is controlled without involving the processor. In FIG. 17 this is shown within the stroke/dot box by way of example for the period of time $T_A$. There is provided an additional counter DETCR which produces a carry CY when the 0 position is reached. The line on which CY appears is connected to the gate 154. The operation is as follows: the processor terminal P16 is defined as the inverse clear input ($\overline{CLE}$) of the counter DETCR whereby the counter is not cleared only during the action (P16 = 1) during which $T_A$ has an effect. Furthermore, in spite of the control via LD and CK, the counter is never of importance and CY also carries 0 signal. Each time when a transition from 0 to 1 occurs on the line C, the counter DETCR is loaded by LD = 1 with a value equal to $-a_A$; a previously reached position, which may have been reached during a previous attempt to count down $-a_A$, is then erased. Terminal T0 of the processor is defined as a clock output via which counting pulses reach the counter DETCR which counts down.

When the counter position 0 is reached, so $T_A$ is reached, the following happens: CY applies a carry signal to gate 154 which is thus prepared. When M itself, or notably another module Mj, causes the line C to become 0, gate 154 also supplies a 0 for the line C via inverter 152. The fast reaction is thus obtained again and $T_R$ is reduced. The counter itself does not advance, because CY = 1 blocks the actuation input: $\overline{ENA} = 1$, so actuation is 0. Thus, CY remains 1. This continues until completion of this action, which means in this example that P17:=0. P16 is then 0 again so $\overline{CLE} = 0$, which means that the counter is cleared, so that CY becomes 0 again and the gate 154 is no longer prepared. The detector can exert no further effect.

What is claimed is:

1. A multi-source/receiver data processing system in which at least one data source and at least one data receiver are connected to a communication bus which consists of at least one transfer medium suitable for the transport of at least one logic level from a source to a receiver both being active particpants, characterized in that:

the system includes a plurality of clock signal generators having different frequencies;

in a source and/or a receiver, determining means (HS) to effect a communication for determining between all sources and/or receivers (Mi) which actively participate in an action concerning a communication whether said bus (C) is ready for executing said action, said means (HS) comprising:

first and second detecting means whereby it can be determined that during a first and a second period of time, respectively, the communication bus is ready for said action, the first period of time being smaller than the second period of time, the first period of time being determined by a preparation time factor of a first active participant, the second period of time being the largest product (R·V) of the set of products (Ri·Vi) of all potential active participants, the product (Ri·Vi) being formed per active participant by a frequency tolerance factor (Ri) of the clock signal generator for the active participant and a response time factor (Vi) of this active participant; such that when an active participant detects that the second period of time has expired, the bus is ready for executing an action and can thus be occupied by this action for this active participant and all further active participants which have also detected, at least during their relevant first period of time, that the bus is ready.

2. A multi-source/receiver data processing system as claimed in claim 1, characterized in that the said determining means (HS) includes means to determine that the communication bus (C) is ready for executing an action and that more than one source/receiver has made requests (start) for establishing a communication connection.

3. A multi-source/receiver data processing system as claimed in claim 1, characterized in that said determining means (HS) selects on the basis of priorty and/or identity data, one from several data sources and/or receivers requesting a communication connection.

4. A multi-source/receiver data processing system as claimed in claim 1, characterized in that the communication bus consisting of at lest one transfer medium is interfaced by a wired logic gate function for each connection of a source/receiver.

5. A multi-source/receiver data processing system as claimed in claims 1 or 2, characterized in that the bus consists of a single transfer medium, the minimum second period of time ($T_B$) satisfying per potential active participant (M) the expression $T_B = a_F \cdot T_C = (R^6 \cdot V) \cdot T_C$, in which Tc is the period duration of the clock signal generator for this active participant (M).

6. A multi-source/receiver data processing system as claimed in the claims 1 or 3, characterized in that the bus consists of a single transfer medium (C), the minimum second period of time ($T_F$) satisfying per potential active participant (M) the expression $T_F = a_F \cdot T_C = (R^4 \cdot V) T_C$, Tc being the period duration of the clock signal generator for this active participant (M).

7. A multi-source/receiver data processing system as claimed in the claims 1 or 2, characterized in that the bus consists of two transfer media (K,D), the minimum second period of time ($T_B$) per potential active participant (M) satisfying the expression $T_B = (R^3 \cdot V) \cdot T_C$, in which Tc is the period duration of the clock signal generator for this participant (M).

8. A multi-source/receiver data processing system as claimed in claims 1 or 3, characterized in that the bus consists of two transfer media (K, D), the minimum second period of time ($T_F$) satisfying per potential active participant (M) the expression $T_F = (R \cdot V) \cdot T_C$, in which Tci is the period duration of the clock signal generator for this active participant (M).

9. A data source and/or receiver adapted to participate actively in an action concerning a data transfer in a system as claimed in claim 1, characterized in that the data source and/or receiver includes:

at least one control input (CR) and one control output (CW), the said means in the source and/or the receiver;

determining means to switch over a logic level "ready" on the communication bus to a logic level "busy" via the control output, after detection in the second detecting means that said second period of time has expired;

means to supply, via the control output, also the logic level "busy" when via the control input (CR) the logic level "busy" produced on the bus by another participant is received and, moreover, the source and/or receiver itself has meanwhile determined, by means of the first detecting means, that at least the first period of time has expired, so that the source and/or receiver can be activated to participate in the execution of a relevant action.

10. A data source and/or receiver as claimed in claim 9, characterized in that it is a digital signal processor which comprises programmed function means which comprise said determined means and an input of which acts as said control input (CR) and an output as said control output (CW).

11. A data source and/or receiver as claimed in claim 10, characterized in that for the source and/or receiver there is arranged a logic level "ready"/"busy" transition detector whereby a "ready"/"busy" transition on the communication bus result in a reduced response time for the supply of the logic level "busy" to its control output (CW) by the data source and/or receiver itself if it has detected that at least the first period of time has expired.

12. A data source and/or data receiver as claimed in claim 9, characterized in that the source and/or receiver comprises a first section (DL1) and a second section (DL2), said first section (DL1) embodying the source and/or receiver function and being connected, via at least one request output (REQ) and an acknowledge input (ACK), to the second section (DL2) which comprises a relevant request input (REQ) and an acknowledge output (ACK) and which furthermore comprises said determining means (HS) for determining whether the communication bus is ready for executing an action concerning a communication, for which purpose the second section can be connected to the bus by way of said control input (CR) and control output (CW).

13. A data source and/or data receiver as claimed in claim 12, characterized in that said second section (DL2) also comprises identity comparison means (ID-COMP) whereby the identity of the data source and/or receiver itself can be compared with an identity presented via the communication bus.

14. A data source and or receiver as claimed in claim 13, characterized in that said identity comparison means in the second section comprise a read-only memory (ROM), an address counter (ADCR), and a logic AND-function element (140), the read-only memory being addressable by the address counter; the address counter counts clock signals, subject to the condition that the bus is "free", which are supplied by the first section via a clock signal generator input (C1), after first a request signal has been received via the request input (REQ); when the counter position is reached which represents the first period of time, the addressed read-only memory produces an output bit whereby the logic AND-function element (140) is prepared; when the counter position is reached which represents the second period of time, or sooner when via the control input (CR) the bus "ready" signal changes over to the bus "busy" signal so that the counter (ADCR) is forced, via AND-function element (140) to the counting position of the second period of time, the location of the read-only memory then addressed also supplies the logic level "busy" to the control output.

15. A data source and/or data receiver as claimed in claim 14, characterized in that the read-only memory (ROM) addressed via the address counter (ADCR) is suitable for executing the identity comparison in co-operation with the identity comparison means (ID-COMP).

16. A multi-source/receiver data processing system as claimed in claim 1, characterized in that the communication bus consists of two transfer media (K, D), one of which serves as the control transfer medium (K) and the other serves as the data transfer medium (D), at least each source/receiver (M) comprising a control medium write terminal and read terminal (KW(M) and Kr(M)) and a data transfer medium write terminal and read terminal (DW(M) and DR(M)).

17. A multi-source/receiver data processing system, as claimed in claim 1, characterized in that the communication bus consists of three transfer media, two of which serve as control transfer media (KA, KB) while the third serves as a data transfer media (D), at least each active participant (M) comprising control transfer medium write terminals and read terminals (KAW(M), KBW(M) and KAR(M), KBR(M))), and a data transfer medium write terminal and read terminal (DW(M) and DR(M)).

18. A multi-source/receiver data processing system as claimed in claim 1, characterized in that the communication bus consists of three transfer media, one of which serves as a control transfer medium (K) and the other two serve as data transfer media (DA and DB), at least each active participant (M) comprising a control transfer medium write terminal and read terminal (KW(M) and KR(M)) and data transfer medium write terminals and read terminals (DAW(M), DBW(M) and DAR(M), DBR(M)).

* * * * *